US009766777B2

(12) United States Patent
Lu et al.

(10) Patent No.: US 9,766,777 B2
(45) Date of Patent: Sep. 19, 2017

(54) METHODS AND APPARATUSES FOR WINDOW DISPLAY, AND METHODS AND APPARATUSES FOR TOUCH-OPERATING AN APPLICATION

(71) Applicants: Lenovo (Beijing) Limited, Beijing (CN); Beijing Lenovo Software Ltd., Beijing (CN)

(72) Inventors: Lu Lu, Beijing (CN); Yu Chen, Beijing (CN); Jun Li, Beijing (CN); Xin Li, Beijing (CN); Shuangxi Huang, Beijing (CN)

(73) Assignees: LENOVO (BEIJING) LIMITED, Beijing (CN); BEIJING LENOVO SOFTWARE LTD., Beijing (CN)

( * ) Notice: Subject to any disclaimer, the term of this patent is extended or adjusted under 35 U.S.C. 154(b) by 547 days.

(21) Appl. No.: 13/666,998

(22) Filed: Nov. 2, 2012

(65) Prior Publication Data

US 2013/0111398 A1 May 2, 2013

(30) Foreign Application Priority Data

Nov. 2, 2011 (CN) .......................... 2011 1 0342315
Dec. 15, 2011 (CN) .......................... 2011 1 0421915

(51) Int. Cl.
*G06F 3/00* (2006.01)
*G06F 3/0482* (2013.01)
*G06F 3/0488* (2013.01)

(52) U.S. Cl.
CPC .......... *G06F 3/0482* (2013.01); *G06F 3/0488* (2013.01)

(58) Field of Classification Search
CPC .. G06F 3/0481–3/0489; G06F 4/0481–4/0489
USPC .......................................... 715/781–802, 834
See application file for complete search history.

(56) References Cited

U.S. PATENT DOCUMENTS

| | | | |
|---|---|---|---|
| 5,499,334 A * | 3/1996 | Staab ............................ | 715/778 |
| 5,524,196 A * | 6/1996 | Blades .......................... | 715/834 |
| 5,706,448 A * | 1/1998 | Blades .......................... | 715/834 |
| 5,973,666 A * | 10/1999 | Challener et al. ............ | 715/810 |
| 6,362,842 B1 * | 3/2002 | Tahara et al. ................. | 715/856 |
| 6,396,506 B1 * | 5/2002 | Hoshino ............. | G06F 3/04855 345/650 |
| 6,925,611 B2 * | 8/2005 | SanGiovanni ................ | 715/834 |

(Continued)

FOREIGN PATENT DOCUMENTS

| | | |
|---|---|---|
| CN | 1299214 A | 6/2001 |
| CN | 101365117 A | 2/2009 |

(Continued)

*Primary Examiner* — Steven B Theriault
(74) *Attorney, Agent, or Firm* — Kinney & Lange, P.A.

(57) ABSTRACT

Disclosed are methods and apparatuses for window display, and methods and apparatuses for touch-operating an application. The method for window display enables displaying a window in an appropriate position for convenient use. The method include displaying a main menu including at least one menu item, determining a first window corresponding to a first menu item in the main menu based on a first input operation on the first menu item, determining a position parameter and/or a direction parameter for the first window, and displaying the first window according to the position parameter and/or the direction parameter. The present application also discloses an apparatus for implementing the method.

7 Claims, 3 Drawing Sheets

(56) References Cited

U.S. PATENT DOCUMENTS

| | | | |
|---|---|---|---|
| 6,996,783 B2* | 2/2006 | Brown et al. | 715/790 |
| 7,287,232 B2* | 10/2007 | Tsuchimura et al. | 715/792 |
| 7,478,326 B2* | 1/2009 | Holecek et al. | 715/716 |
| 7,735,018 B2* | 6/2010 | Bakhash | 715/782 |
| 8,060,840 B2* | 11/2011 | Billow | G06F 3/0481 715/750 |
| 8,231,458 B2* | 7/2012 | Baerlocher | G07F 17/32 273/138.2 |
| 8,289,288 B2* | 10/2012 | Whytock | G06F 3/0416 345/173 |
| 8,341,541 B2* | 12/2012 | Holecek et al. | 715/782 |
| 8,487,888 B2* | 7/2013 | Wigdor | G06F 3/04883 345/173 |
| 8,686,953 B2* | 4/2014 | MacDougall | G06K 9/00228 345/173 |
| 8,826,181 B2* | 9/2014 | Mouilleseaux et al. | 715/834 |
| 8,869,068 B2* | 10/2014 | Primiani et al. | 715/834 |
| 8,898,588 B2* | 11/2014 | Cheon | G06F 1/3231 715/747 |
| 9,021,398 B2* | 4/2015 | Kotler et al. | 715/834 |
| 9,223,340 B2* | 12/2015 | Locker | G06F 1/1605 |
| 2002/0101418 A1* | 8/2002 | Vernier et al. | 345/418 |
| 2002/0122072 A1* | 9/2002 | Selker | 345/834 |
| 2004/0212617 A1* | 10/2004 | Fitzmaurice et al. | 345/440 |
| 2005/0140696 A1* | 6/2005 | Buxton | 345/660 |
| 2005/0178074 A1* | 8/2005 | Kerosetz | G07G 1/0018 52/36.1 |
| 2005/0204306 A1* | 9/2005 | Kawahara et al. | 715/782 |
| 2005/0229134 A1* | 10/2005 | Hetzel et al. | 716/10 |
| 2005/0278654 A1* | 12/2005 | Sims | 715/790 |
| 2005/0285845 A1* | 12/2005 | Dehlin | G06F 3/0481 345/173 |
| 2006/0031786 A1* | 2/2006 | Hillis | G06F 3/04883 715/863 |
| 2006/0107229 A1* | 5/2006 | Matthews et al. | 715/782 |
| 2006/0181519 A1 | 8/2006 | Vernier et al. | |
| 2007/0008300 A1* | 1/2007 | Yang et al. | 345/173 |
| 2007/0220444 A1* | 9/2007 | Sunday et al. | 715/788 |
| 2007/0261003 A1* | 11/2007 | Reissmueller | 715/810 |
| 2007/0300182 A1* | 12/2007 | Bilow | G06F 3/0425 715/799 |
| 2008/0192059 A1* | 8/2008 | Kennedy | G06F 3/0488 345/537 |
| 2008/0222569 A1* | 9/2008 | Champion et al. | 715/834 |
| 2008/0229245 A1* | 9/2008 | Ulerich et al. | 715/834 |
| 2008/0239131 A1* | 10/2008 | Thorn | G06K 9/00248 348/333.01 |
| 2009/0106667 A1 | 4/2009 | Lyle et al. | |
| 2009/0225040 A1 | 9/2009 | Whytock | |
| 2009/0327964 A1* | 12/2009 | Mouilleseaux et al. | 715/834 |
| 2010/0083109 A1* | 4/2010 | Tse | A63F 13/10 715/702 |
| 2010/0095233 A1* | 4/2010 | Skourup | G05B 19/409 715/771 |
| 2010/0201636 A1* | 8/2010 | Kikin-Gil | G06F 3/04883 345/173 |
| 2010/0333013 A1* | 12/2010 | Ouchia et al. | 715/781 |
| 2011/0055775 A1 | 3/2011 | Saito et al. | |
| 2011/0078624 A1* | 3/2011 | Missig | G06F 3/04883 715/802 |
| 2012/0042283 A1* | 2/2012 | Tuesta et al. | 715/834 |
| 2012/0159365 A1* | 6/2012 | Cragun et al. | 715/767 |
| 2012/0262489 A1* | 10/2012 | Caliendo, Jr. | G09G 5/36 345/652 |
| 2013/0246955 A1* | 9/2013 | Schwesig et al. | 715/767 |

FOREIGN PATENT DOCUMENTS

| | | |
|---|---|---|
| CN | 101499253 A | 8/2009 |
| CN | 101606124 A | 12/2009 |
| CN | 101630222 A | 1/2010 |
| JP | 2004005402 A | 1/2004 |
| JP | 2011180990 A | 9/2011 |
| WO | 2011074793 A2 | 6/2011 |

* cited by examiner

METHODS AND APPARATUSES FOR WINDOW DISPLAY, AND METHODS AND APPARATUSES FOR TOUCH-OPERATING AN APPLICATION

TECHNICAL FIELD

The present invention relates to computer and embedding technologies, and in particular to methods and apparatuses for window display, and methods and apparatuses for touch-operating an application.

BACKGROUND

Conventionally a terminal having a touch screen, such as personal computer (PC), tablet computer (Pad) or mobile terminal, will display a window in one of the following manners when a user clicks an icon or triggers an application on the terminal:
1. displaying the window at a preset physical position on the screen, such as the upper right corner or center of the screen;
2. displaying the window at a position where the window was previously closed.

The inventor of the application has found that there are some problems with the conventional display methods. The window cannot be displayed at a position corresponding to the user. Consequently, the user may not face directly the displayed window, and have to move. This is inconvenient to the user. Most of such terminals are designed for use by a single user. It is thus inconvenient when the terminals are used by more than one user.

There are further problems with some conventional techniques. Some of these conventional techniques support two-point touch operation mode, which is developed from the existing windows interactive operation mode. However, these techniques support only usage by a single user, and applications are executed in a single task mode. No interactive mode is enabled for simultaneous use by several users. Further, the software supports only display in a single orientation, and thus the user can only use the terminal along a single orientation. Other of the conventional techniques support multi-touch mode, and the user can perform touch operations at upper and lower positions of the screen. However, these techniques allow the user to use the terminal in just two orientations, which are fixed and unchangeable.

SUMMARY

Embodiments of the present disclosure provide methods and apparatus for window display, which enables displaying a window in an appropriate position for convenient use.

A method for displaying a window on a data processing terminal, the method comprising:
displaying a main menu including at least one menu item;
determining a first window corresponding to a first menu item in the main menu based on a first input operation on the first menu item;
determining a position parameter and/or an orientation parameter for the first window; and
displaying the first window according to the position parameter and/or the orientation parameter.

In an embodiment, the at least one menu item is arranged in a loop to form the main menu. A position for displaying the first window is determined based on the position of the first menu item relative to the main menu.

In an embodiment, the first window is determined to be positioned in an extended part of a line connecting a center of the main menu and the first menu item based on the position of the first menu item relative to the main menu.

In an embodiment, an orientation for displaying the first menu item is a first orientation, an orientation for displaying the first window is a second orientation, and the first orientation is the same as the second orientation.

In an embodiment, the at least one menu item is arranged in a loop to form the main menu which has a shape of circle or regular polygon. The first window is determined to be positioned in a radial orientation of the main menu.

In an embodiment, the terminal comprises at least three edges, and whether the terminal is being used by a user can be determined through detection on the edges. When it is determined that the terminal is being used by a user, determining a first one of the edges which is closest to the user, and determining the first window to be at a position having the shortest distance from the first edge.

In an embodiment, the terminal comprises at least three edges, and whether the terminal is being used by a user can be determined through detection on the edges. When it is determined that the terminal is being used by a user, determining a first one of the edges which is closest to the user, and determining the first window to be displayed in a orientation perpendicular to the first edge.

In an embodiment, the first window is displayed in an orientation perpendicular to a line connecting the eyes of a user in front of any of the menu items.

An apparatus for displaying a window on a data processing terminal, the apparatus comprising:
a first display module configured to display a main menu including at least one menu item;
a first determination module configured to determine a first window corresponding to a first menu item in the main menu based on a first input operation on the first menu item;
a second determination module configured to determine a position parameter and/or an orientation parameter for the first window; and
a second display module configured to display the first window according to the position parameter and/or the orientation parameter.

In an embodiment, the at least one menu item is arranged in a loop to form the main menu. The second determination module is further configured to determine a position for displaying the first window based on the position of the first menu item relative to the main menu.

In an embodiment, the second determination module is further configured to determine the first window to be positioned in an extended part of a line connecting a center of the main menu and the first menu item based on the position of the first menu item relative to the main menu.

In an embodiment, an orientation for displaying the first menu item is a first orientation, an orientation for displaying the first window is a second orientation, and the first orientation is the same as the second orientation.

In an embodiment, the at least one menu item is arranged in a loop to form the main menu which has a shape of circle or regular polygon. The second determination module is further configured to determine the first window to be positioned in a radial orientation of the main menu.

In an embodiment, the terminal comprises at least three edges, and whether the terminal is being used by a user can be determined through detection on the edges. The second determination module is further configured to determine a first one of the edges which is closest to the user when it is determined that the terminal is being used by a user, and determine the first window to be at a position having the shortest distance from the first edge.

In an embodiment, the terminal comprises at least three edges, and whether the terminal is being used by a user can be determined through detection on the edges. The second determination module is further configured to determine a first one of the edges which is closest to the user when it is determined that the terminal is being used by a user, and to determine the first window to be displayed in an orientation perpendicular to the first edge.

In an embodiment, the first window is displayed in an orientation perpendicular to a line connecting the eyes of a user in front of any of the menu items.

The method for displaying a window according to embodiments of the present invention displays a main menu including at least one menu item, determines a first window corresponding to a first menu item in the main menu based on a first input operation on the first menu item, determines a position parameter and/or an orientation parameter for the first window, and displays the first window according to the position parameter and/or the orientation parameter. By displaying a sub menu item or an application according to a position parameter and/or an orientation parameter for a first menu item or according to a position parameter and/or an orientation parameter for a user, it is possible to display a corresponding window in an appropriate position so that it is more convenient for the user to view or use. This improves the user experiences and facilitates practical applications.

A method for touch-operating an application in a data processing terminal, the data processing terminal comprises a screen having a multi-touch function, and displays in operation at least a main menu on the screen, the main menu comprises M touch areas each corresponding to an application, and graphics and/or texts in each of the M touch areas can be displayed in at least two different positive orientations, wherein M is an integer greater than 1, the method comprises:

generating an operation instruction for the main menu based on a first input operation on a region of the screen corresponding to the main menu; for each of the M touch areas, adjusting the display position of the touch area from a first position to a second position based on the operation instruction, wherein the positive orientation for graphics and/or texts in at least one of the M touch areas is different between the first position and the second position;

generating an application enabling instruction based on an operation for enabling an application corresponding to a first touch area on the first touch area; and enabling the application corresponding to the first touch area based on the application enabling instruction.

In an embodiment, each of the M touch areas of the main menu is, at both of its sides, adjacent to one of the touch areas.

In an embodiment, the main menu is of a circle, ellipse or regular polygon shape. If the main menu is of a circle or regular polygon shape, the positive orientation is a radial orientation of the main menu.

In an embodiment, generating an operation instruction for the main menu based on a first input operation on a region of the screen corresponding to the main menu comprises:

generating an operation instruction for the main menu based on a rotation operation with a radian on a region of the screen corresponding to the main menu; or generating an operation instruction for the main menu based on a moving operation along a line on a region of the screen corresponding to the main menu; or generating an operation instruction for the main menu based on a click operation on an initial position of any of the M touch areas and a click operation on a target position on a region of the screen corresponding to the main menu.

In an embodiment, the regions of the screen corresponding to the respective M touch areas are equal or different in size.

In an embodiment, when applications corresponding to the respective M touch areas are enabled, the regions of the screen occupied by the applications are equal or different in size.

In an embodiment, at least one of the M touch areas has at least one corresponding sub touch area;

the method further comprises:

generating a sub touch area enabling instruction based on a second input operation on the touch area having the corresponding sub touch area; and enabling the sub touch area corresponding to the touch area based on the sub touch area enabling instruction.

An apparatus for touch-operating an application in a data processing terminal, the data processing terminal comprises a screen having a multi-touch function, and displays in operation at least a main menu on the screen, the main menu comprises M touch areas each corresponding to an application, and graphics and/or texts in each of the M touch areas can be displayed in at least two different positive orientations, wherein M is an integer greater than 1, the apparatus comprises:

a first generation module configured to generate an operation instruction for the main menu based on a first input operation on a region of the screen corresponding to the main menu;

an adjustment module configured to, for each of the M touch areas, adjusting the display position of the touch area from a first position to a second position based on the operation instruction, wherein the positive orientation for graphics and/or texts in at least one of the M touch areas is different between the first position and the second position;

a second generation module configured to generate an application enabling instruction based on an operation for enabling an application corresponding to a first touch area on the first touch area; and an operation module configured to enable the application corresponding to the first touch area based on the application enabling instruction.

In an embodiment, each of the M touch areas of the main menu is, at both of its sides, adjacent to one of the touch areas.

In an embodiment, the main menu is of a circle, ellipse or regular polygon shape, or an irregular pattern having only one central region. If the main menu is of a circle or regular polygon shape, the positive orientation is a radial orientation of the main menu.

In an embodiment, the first generation module is further configured to:

generate an operation instruction for the main menu based on a rotation operation with a radian on a region of the screen corresponding to the main menu; or generate an operation instruction for the main menu based on a moving operation along a line on a region of the screen corresponding to the main menu; or generate an operation instruction for the main menu based on a click operation on an initial position of any of the M touch areas and a click operation on a target position on a region of the screen corresponding to the main menu.

In an embodiment, the regions of the screen corresponding to the respective M touch areas are equal or different in size.

In an embodiment, when applications corresponding to the respective M touch areas are enabled, the regions of the screen occupied by the applications are equal or different in size.

In an embodiment, at least one of the M touch areas has at least one corresponding sub touch area;

the second generation module is further configured to generate a sub touch area enabling instruction based on a second input operation on the touch area having the corresponding sub touch area; and the operation module is further configured to enable the sub touch area corresponding to the touch area based on the sub touch area enabling instruction.

The method for touch-operating an application according to embodiments of the present invention comprises: generating an operation instruction for the main menu based on a first input operation on a region of the screen corresponding to the main menu; for each of the M touch areas, adjusting the display position of the touch area from a first position to a second position based on the operation instruction, wherein the positive orientation for graphics and/or texts in at least one of the M touch areas is different between the first position and the second position; generating an application enabling instruction based on an operation for enabling an application corresponding to a first touch area on the first touch area; and enabling the application corresponding to the first touch area based on the application enabling instruction. According to the embodiments, the main menu can be rotated and operated simultaneously by multiple users. It is possible to enable the users to always face directly to the main menu, and thus improve convenience.

DETAILED DESCRIPTION OF THE PREFERRED EMBODIMENTS

The method for displaying a window according to embodiments of the present invention displays a main menu including at least one menu item, determines a first window corresponding to a first menu item in the main menu based on a first input operation on the first menu item, determines a position parameter and/or an orientation parameter for the first window, and displays the first window according to the position parameter and/or the orientation parameter. By displaying a sub menu item or an application according to a position parameter and/or an orientation parameter for a first menu item or according to a position parameter and/or an orientation parameter for a user, it is possible to display a corresponding window in an appropriate position so that it is more convenient for the user to view or use. This improves the user experiences and facilitates practical applications.

Figure 1:
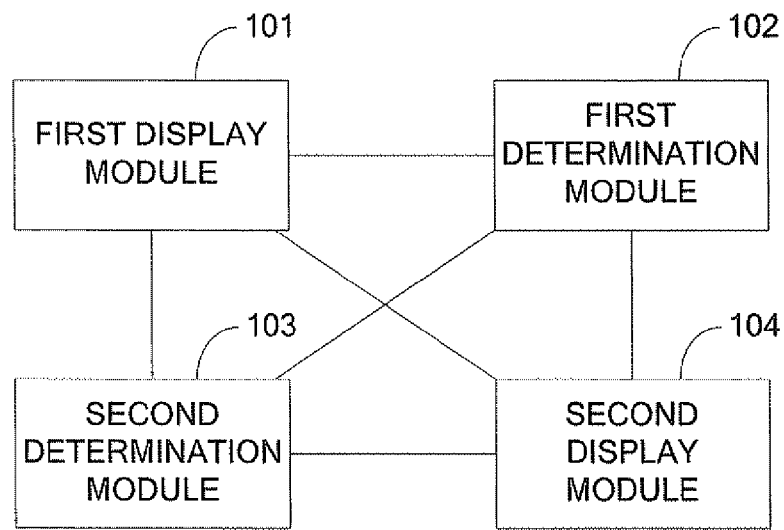
FIG. 1 is a schematic block diagram showing the structure of an apparatus for displaying a window according to an embodiment of the present invention.

Referring to FIG. 1, an apparatus for displaying a window according to an embodiment of the present invention may include a first display module 101, a first determination module 102, a second determination module 103, and a second display module 104. The apparatus may be applied to a data processing terminal.

The first display module 101 may be configured to display a main menu including at least one menu item. The first display module 101 may display at last a main menu on a screen of a data processing terminal during the operation of the terminal. The main menu may include M menu items arranged in a loop to form the main menu. Each of the M menu items may be, at either of its sides, adjacent to one of the M menu items. At least one of the M menu items may correspond to an application, and/or correspond to a sub menu item. M may be an integer not less than 1. Each of the M menu items in the main menu may correspond to a different type of application. The user may initiate an application, such as playing back videos or viewing photos, after performing an input operation on the corresponding menu item. Alternatively, at least one of the M menu items may correspond to a sub menu item. The sub menu item may be preferably in a shape of fan. If the main menu can be rotated or moved, the corresponding sub menu item will be rotated or moved along with the rotation or movement of the main menu. Each menu item or sub menu item may have corresponding texts and/or graphics placed thereon for explaining content corresponding to the menu item or the sub menu item. For example, a menu item may be "video," and the sub menu items under the menu item may be classified into different categories, such as "entertainment video," "sports video" and the like. If a menu item may correspond to sub menu items, the sub menu items under the menu item may be displayed when the user clicks on the menu item. The user may initiate the desired application by clicking on the corresponding sub menu item. The embodiment of the present invention may allow the user to use several applications simultaneously, and also allow multiple users to operate on the screen.

In an embodiment, the main menu may be in different shapes, such as circle, polygon or ellipse. The main menu may be rotatable to allow a user to rotate it clockwise or counter-clockwise at any angle. The graphics and/or texts on the main menu may be rotated, along with the rotation of the main menu, to a position desirable by the user. The main menu may be an enclosed pattern.

Figure 2:
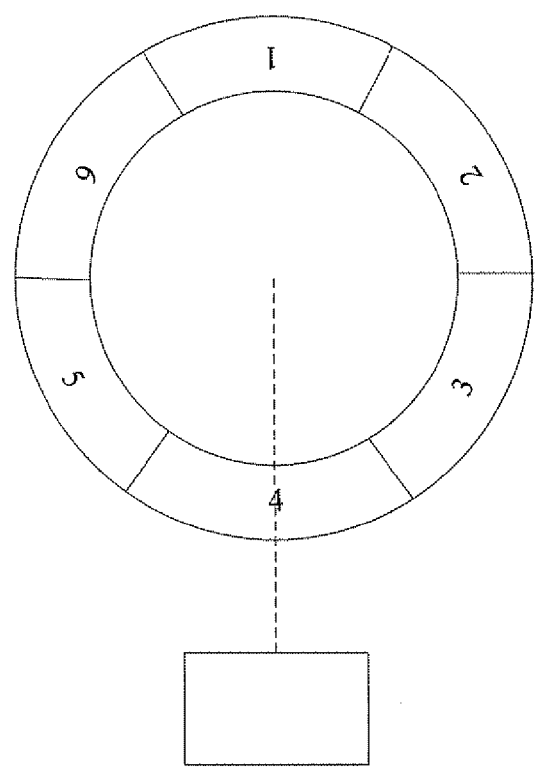
FIG. 2 shows a schematic diagram of a circular main menu according to an embodiment of the present invention.

In an example shown in FIG. 2, the main menu is in a circle shape and partitioned into 6 touch areas. Each of the touch areas may represent a different type of application. Graphics and/or texts for each touch area may be arranged in an orientation perpendicular to the tangent of the circle. No matter along which orientation a user operates the main menu on the screen, graphics and/or texts on the main menu closest to the user may always face directly the user. This guarantees that the user may always perform operations, such as selection, along a positive orientation, and thus improves convenience.

The first determination module 102 may be configured to determine a first window corresponding to a first menu item in the main menu based on a first input operation on the first menu item. When the user performs the first input operation on the first menu item in the main menu, the first determination module 102 may determine the first window corresponding to the first menu item. The first window may represent an application or sub menu items. In an embodiment, the size of the first window may be smaller than that of the display region of the terminal screen.

The second determination module 103 may be configured to determine a position parameter and/or an orientation parameter for the first window. After the first determination module 102 determines the first window corresponding to the first menu item, the second determination module 103 may determine a corresponding position parameter and/or orientation parameter for the first window.

For example, the second determination module 103 may determine the first window to be positioned in an extended part of a line connecting a center of the main menu and the first menu item based on the position of the first menu item relative to the main menu, as shown in FIG. 2 in which the dotted line denotes the extended part of the line connecting the center of the main menu and the first menu item. The orientation for displaying the first menu item is a first orientation, the orientation for displaying the first window is a second orientation, and the first orientation are the same as the second orientation.

Alternatively, if the main menu is of a circle or regular polygon shape, the second determination module 103 may determine the first window to be positioned in a radial orientation of the main menu. The radial of the main menu may have its endpoint as the center of the main menu. The main menu may be rotatable or not rotatable.

The terminal may include at least three edges. The second determination module 103 may perform detection, such as detection at regular interval, periodical detection or random detection, on each of the edges to determine whether the terminal is being used by a user. When it is determined that the terminal is being used by a user, the second determination module 103 may determine a first one of the edges which is closest to the user, and then determine the first window to be at a position having the shortest distance from the first edge. That is, the first window is placed at a position having the shortest distance from the user so that it is more convenient for the user to view the first window. Alternatively, the second determination module 103 may determine the first window to be displayed in an orientation perpendicular to the first edge, that is, placing the first window at a position directly facing the user. Preferably, the first window for any menu item may be displayed in an orientation perpendicular to a line connecting the eyes of the user operating on the menu item, and the first window may be displayed in an orientation away from the user.

The second display module 104 may be configured to display the first window according to the position parameter and/or the orientation parameter. After the second determination module 103 determines the display position and orientation for the first window, the second display module 104 may display the first window according to the determined display position and orientation.

If the main menu is rotatable, the user may rotate a menu item in the main menu to a positive orientation with respect to the user before operating on the menu item. The second determination module 103 may determine a positive orientation for a sub menu item or an application with respect to the user, based on a position and/or orientation parameter of the user, so that the application or sub menu item may be displayed in a positive orientation with respect to the user, and thus convenient to use by the user. If the user performs an input operation on the first menu item displayed in the positive orientation with respect to the user, the operation module 102 may also display the sub menu item or the application to be enabled according to the position and/or orientation parameter of the first menu item.

If the user does not first rotate the main menu, or if the main menu is not rotatable, the first menu item to be operated may be not in the positive orientation with respect to the user. In this case, when the user performs an input operation on the first menu item, the first determination module 102 may determine a first window corresponding to the first menu item, the second determination module 103 may determine a position parameter and/or an orientation parameter corresponding to the first window, and the second display module 104 may display the sub menu item or application to be enabled in an orientation as close as possible to the positive orientation with respect to the user, based on the position parameter and/or orientation parameter determined by the second determination module 103. Here, the positive orientation with respect to the user in the embodiment may refer to an orientation perpendicular to a line connecting the eyes of the user in front of an input area closest to the user. In other words, the first window may be display in an orientation perpendicular to a line connecting the eyes of the user in front of any of the menu items.

Hereafter an example of a method for displaying a window will be described.

Figure 3:
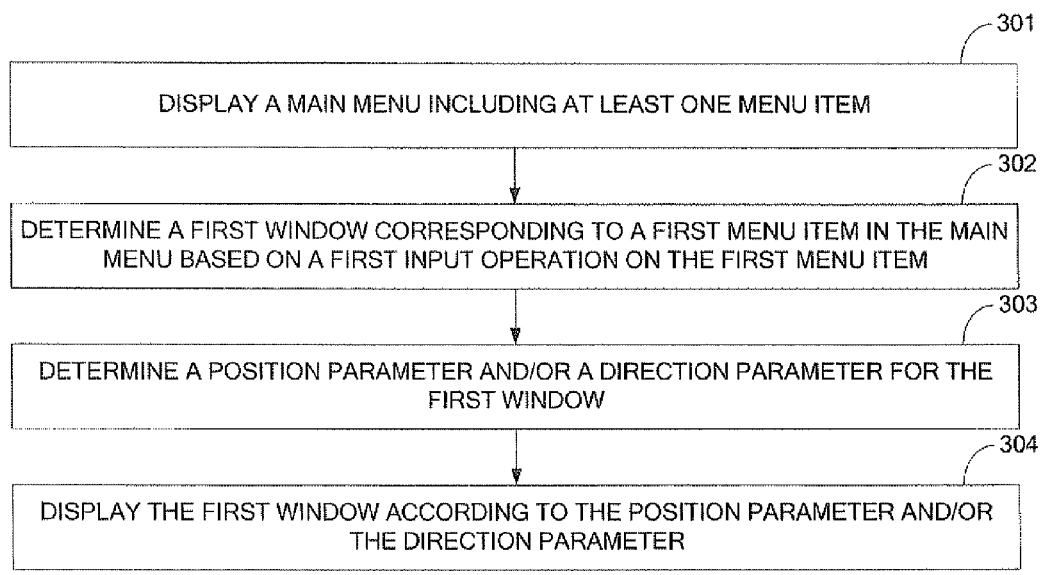
FIG. 3 is a schematic flowchart showing a method for displaying a window according to an embodiment of the present invention.

The flow of the method for displaying a window in an embodiment is shown in FIG. 3. The method may be applicable in a data processing terminal.

Step 301: displaying a main menu including at least one menu item;

Step 302: determining a first window corresponding to a first menu item in the main menu based on a first input operation on the first menu item;

Step 303: determining a position parameter and/or an orientation parameter for the first window; and Step 304: displaying the first window according to the position parameter and/or the orientation parameter.

The method for displaying a window according to embodiments of the present invention displays a main menu including at least one menu item, determines a first window corresponding to a first menu item in the main menu based on a first input operation on the first menu item, determines a position parameter and/or an orientation parameter for the first window, and displays the first window according to the position parameter and/or the orientation parameter. By displaying a sub menu item or an application according to information about position and/or orientation for a first menu item, it is possible to display a corresponding window in an appropriate position so that it is more convenient for the user to view or use. This improves the user experiences and facilitates practical applications. Alternatively, a sub menu item or an application may be displayed according to information about position and/or orientation of the user performing the first input operation, so that the sub menu item or application may be displayed in the positive orientation with respect to the user, even though the main menu is not rotatable or the user does not rotate the main menu in advance. This facilitates the user's operation, and improves intelligence, user-friendliness and flexibility of a device.

In another aspect of the present invention, a method for touch-operating an application according to embodiments of the present invention may include: generating an operation instruction for the main menu based on a first input operation on a region of the screen corresponding to the main menu; for each of the M touch areas, adjusting the display position of the touch area from a first position to a second position based on the operation instruction, wherein the positive orientation for graphics and/or texts in at least one of the M touch areas is different between the first position and the second position; generating an application enabling instruction based on an operation for enabling an application corresponding to a first touch area on the first touch area; and enabling the application corresponding to the first touch area based on the application enabling instruction. According to the embodiments, the main menu can be rotated and operated simultaneously by multiple users. It is possible to enable the users to always face directly to the main menu, and thus improve convenience.

Figure 4:
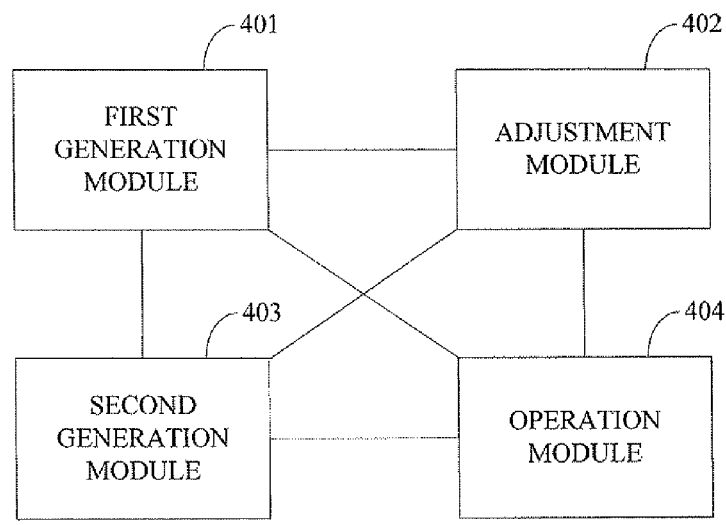
FIG. 4 is a schematic block diagram showing the structure of an apparatus for touch-operating an application according to an embodiment of the present invention.

Referring to FIG. 4, an apparatus for touch-operating an application according to embodiments of the present invention may include a first generation module 401, an adjustment module 403, a second generation module 403 and an operation module 404. The apparatus may be applied to a data processing terminal equipped with a screen having a multi-touch function. The data processing terminal may display in operation at least a main menu on the screen. The main menu may include M touch areas each of which is, at both of its sides, adjacent to one of the touch areas. Each of the M touch areas may correspond to an application. Graphics and/or texts in each of the M touch areas can be displayed in at least two different positive orientations, wherein M is an integer greater than 1.In embodiments of the present invention, a positive orientation may refer to an orientation in which graphics and/or texts in the touch areas face directly the user. In other words, the positive orientation in which graphics and/or texts in any of the touch areas are displayed is an orientation perpendicular to a line connecting the eyes of the user in front of the touch area. In an embodiment, the main menu may be an enclosed spatial pattern. A radial of the main menu may have its endpoint as the center of the main menu.

The first generation module 401 may be configured to generate an operation instruction for the main menu based on a first input operation on a region of the screen corresponding to the main menu. The user may perform the first input operation on a region of the screen corresponding to the main menu. For example, the first generation module 401 may generate an operation instruction for the main menu based on a rotation operation with a radian on a region of the screen corresponding to the main menu, or generate an operation instruction for the main menu based on a moving operation along a line on a region of the screen corresponding to the main menu, or generate an operation instruction for the main menu based on a click operation on an initial position of any of the M touch areas and a click operation on a target position on a region of the screen corresponding to the main menu.

The adjustment module 403 may be configured to, for each of the M touch areas, adjusting the display position of the touch area from a first position to a second position based on the operation instruction, wherein the positive orientation for graphics and/or texts in at least one of the M touch areas may be different between the first position and the second position. In an embodiment, there is a first touch area among the M touch areas. The first position of the first touch area is further away from the user than the second position of the first touch area. The adjustment module 403 may, based on the operation instruction, move the desired first touch area in the main menu to a position closer to the user.

Each of the M touch areas in the main menu may correspond to a different type of application, and thus a type of application, such as playing back video or viewing photos, may be initiated when the user clicks on the corresponding touch area. Alternatively, at least one of the M touch areas may correspond to at least one sub touch area. In an embodiment, the sub touch area may be in a shape of fan. When the main menu is rotated or moved, the sub touch area may be rotated or moved along with the main menu. For example, one of the touch areas may correspond to "video," and the sub touch areas under the touch area may correspond to different categories, such as "entertainment video," or "sports video." If a touch area has corresponding sub touch areas, these sub touch areas may be displayed when the user clicks on the touch area. Then, the user may initiate the desired application by clicking on one or more of the sub touch area. These embodiments of the present invention allow a user to use more than one application simultaneously, and also allow several users to operate simultaneously.

Figure 5:
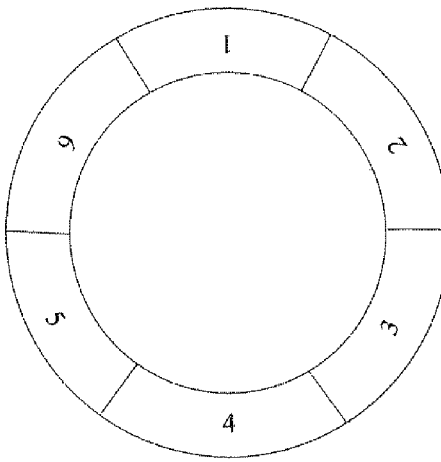
FIG. 5 shows a schematic diagram of a circular main menu according to an embodiment of the present invention.

In an embodiment, the main menu may be rotatable. The main menu may be in different shapes, such as circle, polygon or ellipse. The main menu may be rotated clockwise or counter-clockwise at any angle. At the same time, graphics and/or texts on the main menu may be rotated along with the main menu to a position as expected by the user. When the main menu is in a shape of circle or regular polygon, the positive orientation may refer to a radial orientation of the main menu in embodiments of the present invention. FIG. 5 shows an example of the main menu. The main menu is shaped as a circle, and partitioned into 6 touch areas. Each of the touch areas may represent a type of application, and graphics and/or texts (in FIG. 5, texts are taken as an example) on each touch area may be displayed in an orientation perpendicular to the tangent of the circle. No matter in which orientation the main menu is operated by the user, graphics and/or texts on the main menu closest to the user may always face directly the user. This guarantees that the user may always operate the main menu in a positive orientation, which is convenient for the user's operation.

In an embodiment, the sub touch areas may be scaled up or down. For example, the sub touch area may be scaled up or down by the user's manual operation. The user may separate his or her two fingers in a direction of increasing the distance between the two fingers while touching one of the sub touch area, and accordingly the sub touch area may be increased in size. The user may also pinch his or her two fingers in a direction of decreasing the distance between the two fingers while touching one of the sub touch area, and accordingly the sub touch area may be decreased in size. The respective M touch areas may correspond to display regions on the screen which are equal or different in size. The sizes of these display regions may be adjustable. For example, the first touch area may correspond to 3 sub touch areas, and their display regions on the screen may be equal or different in size. The sizes of the display regions may be adjustable. In another example, the first touch area may correspond to one sub touch area, and the second touch area may correspond to 3 sub touch areas. The display regions on the screen corresponding to the four sub touch areas may be equal or different in size. The sizes of the display regions may be adjustable.

The second generation module 403 may be configured to generate an application enabling instruction based on an operation for enabling an application corresponding to a first touch area on the first touch area. The user may operate on the first touch area, such as clicking on the touch area. The second generation module 403 may generate an application enabling instruction when receiving the clicking operation.

The second generation module 403 may be further configured to generate a sub touch area enabling instruction based on a second input operation on the touch area having the corresponding sub touch area. In an embodiment, the second input operation may be a clicking operation. When the user clicks on a touch area corresponding to a sub touch area, the second generation module 403 receives the click operation by the user, and generates a sub touch area enabling instruction.

The operation module 404 is configured to enable the application corresponding to the first touch area based on the application enabling instruction. When receiving the application enabling instruction, the operation module 404 may enable the application corresponding to the first touch area. The application enabling instruction may carry a touch area identifier so that the operation module 404 may enable an application corresponding to the touch area as identified by the touch area identifier.

The operation module 404 may automatically adjust the size of the screen region occupied by each application, if necessary. For example, a user is watching video, and another user is listening to music. The video application may require a larger region of the screen, and accordingly the operation module 404 may increase the size of the screen region occupied by the video application. Alternatively, the user may perform manual adjustment. For example, an application may be embedded with buttons for scale-up or scale-down, and the user may perform adjustment by clicking on these buttons. When applications corresponding to the respective M touch areas are enabled, these applications may occupy regions of the screen having equal or different sizes. The size of each region may be adjustable.

The operation module 404 may be further configured to enable the sub touch area corresponding to the touch area based on the sub touch area enabling instruction. When receiving the sub touch area enabling instruction sent from the second generation module 403, the operation module 404 may enable the sub touch area corresponding to the touch area based on the sub touch area enabling instruction. In an embodiment, the sub touch area enabling instruction may carry a touch area identifier, and the operation module 404 may enable a sub touch area corresponding to the touch area as identified by the touch area identifier.

Hereafter an example of a method for touch-operating an application will be described.

Figure 6:
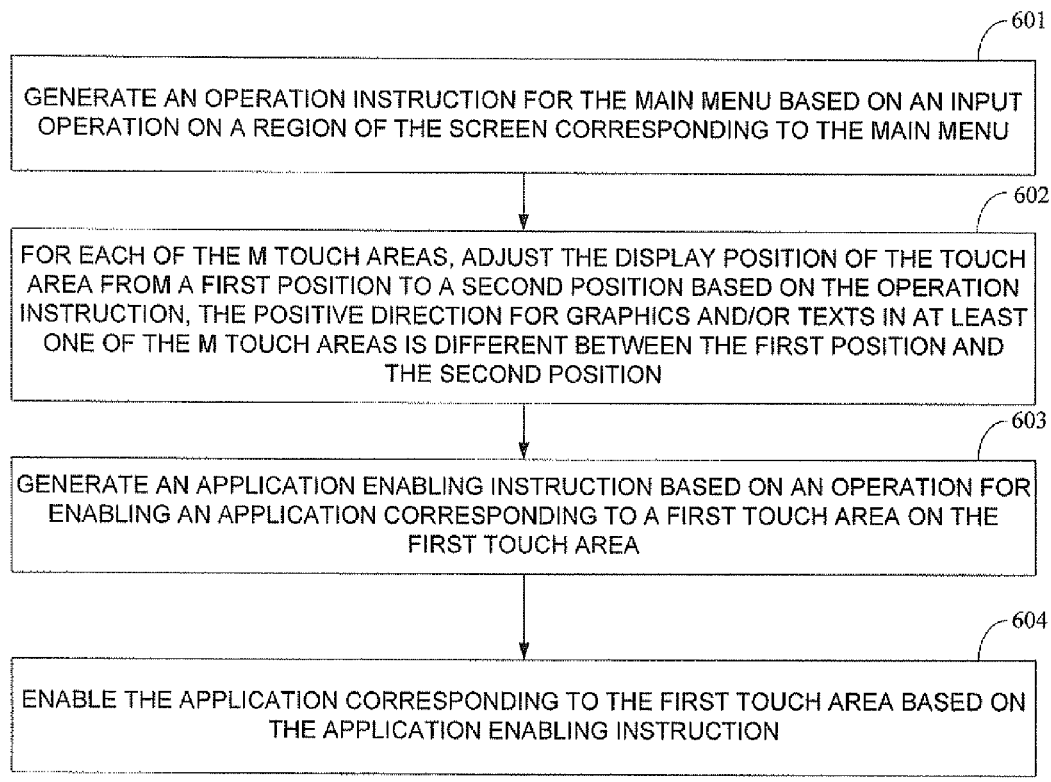
FIG. 6 is a schematic flowchart showing a method for touch-operating an application according to an embodiment of the present invention.

The flow of the method for touch-operating an application in an embodiment is shown in FIG. 6.

Step 601: generating an operation instruction for the main menu based on a first input operation on a region of the screen corresponding to the main menu;

Step 602: for each of the M touch areas, adjusting the display position of the touch area from a first position to a second position based on the operation instruction, wherein the positive orientation for graphics and/or texts in at least one of the M touch areas is different between the first position and the second position;

Step 603: generating an application enabling instruction based on an operation for enabling an application corresponding to a first touch area on the first touch area; and Step 604: enabling the application corresponding to the first touch area based on the application enabling instruction.

The method may be applied to a data processing terminal equipped with a screen having a multi-touch function. The data processing terminal may display in operation at least a main menu on the screen. The main menu may include M touch areas each corresponding to an application. Graphics and/or texts in each of the M touch areas can be displayed in at least two different positive orientations, wherein M is an integer greater than 1.

The method for touch-operating an application according to embodiments of the present invention comprises: generating an operation instruction for the main menu based on a first input operation on a region of the screen corresponding to the main menu; for each of the M touch areas, adjusting the display position of the touch area from a first position to a second position based on the operation instruction, wherein the positive orientation for graphics and/or texts in at least one of the M touch areas is different between the first position and the second position; generating an application enabling instruction based on an operation for enabling an application corresponding to a first touch area on the first touch area; and enabling the application corresponding to the first touch area based on the application enabling instruction. According to the embodiments, the main menu can be rotated and operated simultaneously by multiple users. It is possible to enable the users to always face directly to the main menu, and thus improve convenience. Regions of the screen occupied by the touch areas or applications may be adjusted in size as required. The main menu may be presented in different shapes. This also improves convenience and flexibility.

Those skilled in the art will appreciate that embodiments of the present invention may be provided as methods, systems or computer program products, and thus may take a form of hardware, software or combination thereof. Embodiments of the present invention may also be implemented as computer program product in the form of one or more computer readable storage media (including but not limited to disk memories and optical memories) containing computer readable program codes.

The present invention has been described with reference to flowcharts and/or block diagrams of methods, apparatuses (systems) and computer program products according to embodiments of the present invention. It will be appreciated that each step and/or block in the flowcharts and/or block diagrams or combination thereof may be implemented in computer program instructions. The computer program instructions may be loaded onto a processor of a general computer, a dedicated computer, an embedded processing device or any other programmable data processing device to generate a machine, so that the instructions, when executed by the processor of the computer or other programmable data processing device, generate means for performing the functions specified in one or more steps and/or blocks in the flowcharts and/or block diagrams.

These computer program instructions may be also stored in a computer readable memory that may direct computers or other programmable data processing devices to operate in a specific manner, so that the instructions stored in the computer readable memory may generate a manufacture article containing instruction means which perform the functions specified in one or more steps and/or blocks in the flowcharts and/or block diagrams.

These computer program instructions may be also loaded onto computers or other programmable data processing devices, so that the computers or other programmable data processing devices perform a sequence of operation steps for computer-implemented processing. When executed on the computers or other programmable data processing devices, the instructions provide steps for performing the functions specified in one or more steps and/or blocks in the flowcharts and/or block diagrams.

The foregoing description is intended to illustrate the exemplary embodiments of the present disclosure. It will be readily understood by a person skilled in the art that various modifications and variations may be made to the present invention without departing from the spirit and scope of the present invention, and these modifications and variations also fall into the scope of the present invention.

What is claimed is:

1. A method for displaying a window on a data processing terminal, the method comprising:
   displaying a main menu including at least two menu items corresponding to respective applications;
   determining a first window for an application corresponding to a first menu item in the main menu based on a first input operation on the first menu item by a user;
   determining an orientation parameter and a position parameter for the first window based on a position of the first menu item in the main menu;
   displaying the first window according to orientation parameter and the position parameter;
   wherein orientations for displaying the at least two menu items are different from each other so that the respective applications corresponding to the menu items are displayed complying with the orientations for displaying the menu items;
   wherein the terminal comprises at least three side frames, and upon determining that the terminal is being used by a user, a first one of the side frames which is closest to the user is determined; and
   wherein said determining a position parameter for the first window comprises determining the first window to be at a position having the shortest distance from the first side frame, and said determining an orientation parameter for the first window comprises determining the first window to be displayed in a direction perpendicular to the first side frame.

2. The method of claim 1, wherein the at least two menu items are arranged in a loop to form the main menu.

3. The method of claim 2, wherein said determining a position for displaying the first window based on the position of the first menu item relative to the main menu comprises determining the first window to be positioned in an extended part of a line connecting a center of the main menu and the first menu item based on the position of the first menu item in the main menu.

4. The method of claim 2, wherein the at least two menu items are arranged in a loop to form the main menu which has a shape of circle or regular polygon; and said determining a position parameter for the first window comprises determining the first window to be positioned in a radial orientation of the main menu.

5. An apparatus for displaying a window on a data processing terminal, the apparatus comprising a processor and a memory storing instructions, such that when executing the instructions, the processor is configured to:
   display a main menu including at least two menu items corresponding to respective applications;
   determine a first window for an application corresponding to a first menu item in the main menu based on a first input operation on the first menu item by a user;
   determine an orientation parameter and a position parameter for the first window based on a position of the first menu item in the main menu; and
   display the first window according to the orientation parameter and the position parameter;
   wherein orientations for displaying the at least two menu items are different from each other so that the respective applications corresponding to the menu items are displayed complying with the orientations for displaying the menu items; and
   wherein the terminal comprises at least three side frames, and the processor is further configured to, upon determining that the terminal is being used by a user, determine a first one of the side frames which is closest to the user, determine the first window to be at a position having the shortest distance from the first side frame, and determine the first window to be displayed in a direction perpendicular to the first side frame.

6. The apparatus of claim 5, wherein the first window is positioned in an extended part of a line connecting a center of the main menu and the first menu item based on the position of the first menu item based on the position of the first menu item in the main menu.

7. The apparatus of claim 6, wherein the at least two menu items are arranged in a loop to form the main menu which has a shape of circle or regular polygon; and
   the processor is further configured to determine the first window to be positioned in a radial orientation of the main menu.

* * * * *